United States Patent
Hayami (10) Patent No.: US 6,459,663 B1
(45) Date of Patent: Oct. 1, 2002

(54) CORRECTION OF TRACKING-ERROR SIGNAL FOR INFORMATION REPRODUCING SYSTEM

(75) Inventor: Junichi Hayami, Tokorozawa (JP)

(73) Assignee: Pioneer Electronic Corporation, Tokyo-to (JP)

(*) Notice: Subject to any disclaimer, the term of this patent is extended or adjusted under 35 U.S.C. 154(b) by 0 days.

(21) Appl. No.: 09/197,937

(22) Filed: Nov. 23, 1998

(30) Foreign Application Priority Data

Nov. 27, 1997 (JP) .............................................. 9-325690

(51) Int. Cl.$^7$ ................................................ G11B 7/00
(52) U.S. Cl. ................................ 369/44.29; 369/44.32; 369/44.35; 369/124.15
(58) Field of Search ........................... 369/44.27, 44.28, 369/44.29, 44.35, 44.36, 44.32, 124.15

(56) References Cited

U.S. PATENT DOCUMENTS

| | | | | | |
|---|---|---|---|---|---|
| 5,048,002 A | * | 9/1991 | Horie et al. | ............. | 369/44.36 |
| 5,416,759 A | * | 5/1995 | Chun | ....................... | 369/44.36 |
| 5,796,687 A | * | 8/1998 | Baba | ........................ | 369/44.35 |
| 6,031,799 A | * | 2/2000 | Hwang | .................... | 369/44.35 |
| 6,084,835 A | * | 7/2000 | Buchler et al. | ......... | 369/44.35 |

FOREIGN PATENT DOCUMENTS

JP            06036313            2/1994

* cited by examiner

*Primary Examiner*—Nabil Hindi
(74) *Attorney, Agent, or Firm*—Ladas & Parry (57) ABSTRACT

To finely remove an offset from a tracking-error signal which is processed in the digital form at the stage of tracking servo control, an apparatus and method of correcting the offset is provided. In the apparatus and method, an oscillating tracking-error signal used for positionally controlling an optical beam irradiated onto a storage medium to reproduce information recorded thereon is produced. The tracking-error signal is produced in an analog form, then converted into a digital form for use of control of the optical beam. First, set are a first adjustment amount to correct an offset included in the analog-form tracking-error signal as well as a second adjustment amount to correct a further offset included in the digital-form tracking-error signal in the digital form. The analog-form tracking-error signal is corrected with the first adjustment amount (i.e., coarse adjustment), then the digital-form tracking-error signal is corrected with the second adjustment amount (fine adjustment).

16 Claims, 3 Drawing Sheets

CORRECTION OF TRACKING-ERROR SIGNAL FOR INFORMATION REPRODUCING SYSTEM

BACKGROUND OF THE INVENTION

The present invention relates to a technical field of correcting a tracking-error signal, and particularly to removal of an offset included in a tracking-error signal used for control, referred to as tracking servo control, executed in optically reproducing information recorded on a storage medium.

In general, for optically reading information recorded on a storage medium such as an optical disk using an optical beam such as a laser beam, two types of control referred to as a tracking servo control and a focus servo control are indispensable. The tracking servo control is to make it agree to each other both the focus position of an optical beam and the position of a track composed of information to be reproduced and formed on the storage medium, while the focus serve control is to make it agree to each other both the focus position and the position of an information-recorded area on the storage medium.

Practically, in the tracking serve control, reflected light formed by reflecting an irradiated optical beam to a storage medium is used to produce a tracking-error signal indicative of degrees in shift between the focus position of the irradiated optical beam and the position of an information track, and an objective lens for collecting optical beams is driven to bring the tracking-error signal into zero.

A theoretical truth is that the center in levels of the tracking-error signal represents the zero level when an irradiated position (i.e., converging position) of an optical beam is at the center axis of an information track, but the center level of the tracking-error signal may be shifted from the zero level. That is, an offset may be caused and included in the tracking-error signal on account of variability in characteristics of components of an optical system or electrical circuitry in an information reproducing system, or others.

A servo circuit responsible for tracking servo control using such tracking-error signal is designed on a precondition that such offset is not caused. Thus, a tracking-error signal including the offset results in that, when it is supplied to the servo circuit, the servo control causes the converging position of the optical beam to shift from the center axis of an information track by an amount which corresponds to the offset included.

A recent development in the digital signal processing technique leads to a tendency to digitize servo circuits for the tracking servo control. In such digitized servo circuits, the tracking-error signal produced is digitized, then supplied to servo circuits.

However, if the tracking-error signal which includes an offset is digitized, there occurs a problem that a linearity in an offset side in the digital conversion characteristics is not guaranteed.

For example, in cases that an AD converter has a performance of resolution of 8 bits (the number of quantization), a tracking-error signal provided in the form of analog quantities undergoes the analog-to-digital conversion with a condition that the center level of the signal is assigned to "80HEX (in the hexadecimal notation)" in a dynamic range of the converter, a plus-side maximum amplitude is assigned to "00HEX," and a minus-side amplitude is assigned to "FFHEX," respectively. If the tracking-error signal contains an offset, a maximum amplitude in the offset side will exceed the designed dynamic range of the A/D converter, the excessive signal part is fixed to a certain value, without being digitized.

To avoid this, a conventional technique, referred to a tracking balance circuit, is provided, wherein an offset component is extracted from an analog tracking-error signal before being supplied to a digital servo circuit, and the offset component is polarity-inverted and added to the tracking-error signal before being supplied to the servo circuit. Accordingly, the offset can be cancelled before digitization.

However, according to the conventional analog-type tracking balance circuit, there is a problem that it is difficult to perform an accurate tracking servo control, due to an offset remaining in the tracking-error signal digitized afterward, because the offset is not completely removed. Thus, with a condition that a slight amount of the offset which does not affect a linearity in digitization still remains in the analog tracking-error signal, the digitization also results in a digitized tracking-error signal including a "remaining offset."

On one hand, there is another problem concerning the A/D converter itself. Variations in accuracy and other factors of such components as ladder-connected resistors arranged within the A/D converter causes a reference level of each A/D converter to deviate from its designed value. Hence, even when an offset is removed from the tracking-error signal, the center level of the tracking-error signal may still differ from the reference level of the A/D converter. This leaves the "remaining offset" in the tracking-error signal, causing the same problem as discussed above.

SUMMARY OF THE INVENTION

Accordingly, it is an object of the present invention to solve the above problem, that is, to provide a technique for correcting a tracking-error signal, which is able to sufficiently remove an offset from the tracking-error signal in order to perform tracking servo control accurately, providing an accurate reproduction of information recorded on a storage medium.

In order to realize the above object, as one aspect of the present invention, there is provided an apparatus for correcting an offset included in an oscillating tracking-error signal indicative of a difference between a position of an information track formed on a storage medium with information to be reproduced and a position of an optical beam irradiated onto the storage medium to reproduce the information. In the apparatus, the tracking-error signal in an analog form is produced by producing means based on a reflected beam of the optical beam from the storage medium, a first offset-correcting signal is added to the analog tracking-error signal by first adding means such that the offset is removed therefrom, thereby producing an added tracking-error signal in the analog form, the added tracking-error signal is digitized by digitized means to produce a digital tracking error signal, and a second offset-correcting signal is added to the digital tracking-error signal by the second adding means such that the offset is removed therefrom, thereby producing an added digital tracking-error signal. Concurrently, in the apparatus, the offset corresponding to a difference between a center level of the tracking-error signal and a preset reference level is detected by the detecting means, the detected offset is compared to a threshold preset on a maximum amplitude of the tracking-error signal by the comparing means, and, by controlling means, the first offset-correcting signal is provided for the first adding means when the comparing means shows that the detected offset is not less than the threshold and the second offset-correcting signal is provided for the second adding means when the comparing means shows that the detected offset is smaller than the threshold.

Accordingly, the correction called coarse adjustment is first carried out by removing an amount corresponding to the first offset-correcting signal from the tracking-error signal before it is digitized, of which offset is still larger than the threshold. Then, the correction called fine adjustment is carried out by removing another amount corresponding to the second offset-correcting signal from the tracking-error signal after it has been digitized, of which offset has already been lowered to an amount not more than the threshold. This two-stage correction permits the offset included in the tracking-error signal for digital processing to be removed in a steady, stable and accurate fashion.

As another aspect of the present invention, there is provided a method of correcting an oscillating tracking-error signal used for positionally controlling an optical beam irradiated onto a storage medium to reproduce information recorded thereon, the tracking-error signal being produced in an analog form, and then converted into a digital form for use of control of the optical beam. The method comprises the steps of setting a first adjustment amount to correct an offset included in the analog-form tracking-error signal as well as a second adjustment amount to correct a further offset included in the digital-form tracking-error signal in the digital form, first correcting the analog-form tracking-error signal with the first adjustment amount, and second correcting the digital-form tracking-error signal with the second adjustment amount.

By this method, the foregoing two-stage correction is also provided, permitting the offset included in the tracking-error signal to be removed in a steady, stable and accurate fashion.

Still, as another aspect of the present invention, a system for reproducing information recorded on a storage medium is provided. The information reproducing system comprises an apparatus for correcting an offset included in the tracking-error signal, which is configured like the foregoing one, mean for tracking-controlling the irradiated position of the optical beam on the basis of the added digital tracking-error signal, and means for reproducing the recorded information on the basis of the reflected beam.

Therefore, the offset included in the tracking-error signal is steadily, finely removed, leading to an accurate reproduction of information recorded on the medium.

DESCRIPTION OF THE PREFERRED EMBODIMENTS

Figure 1:
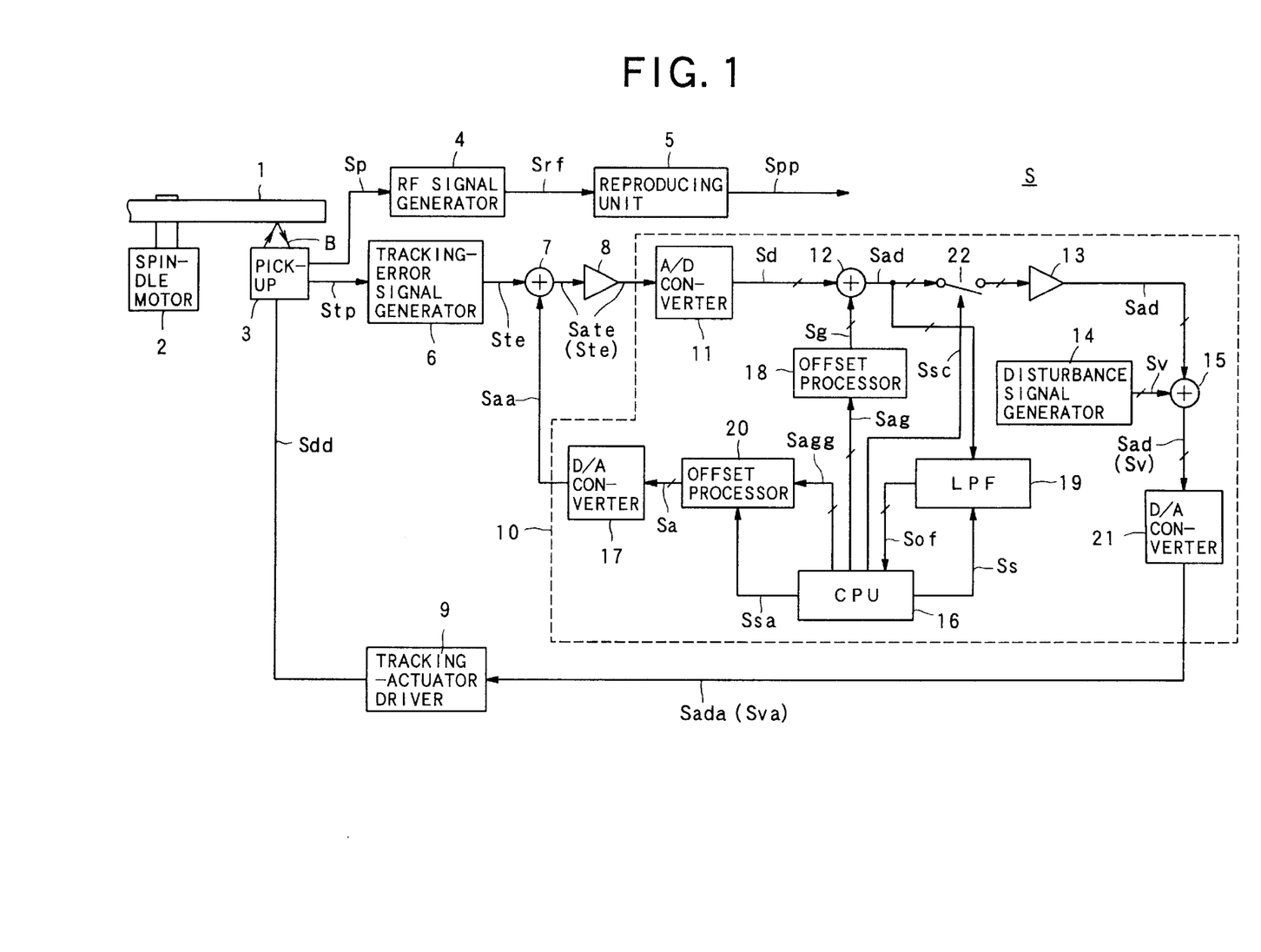
FIG. 1 is a schematic block diagram of an information reproducing system according to an example of the present invention.
Figure 2:
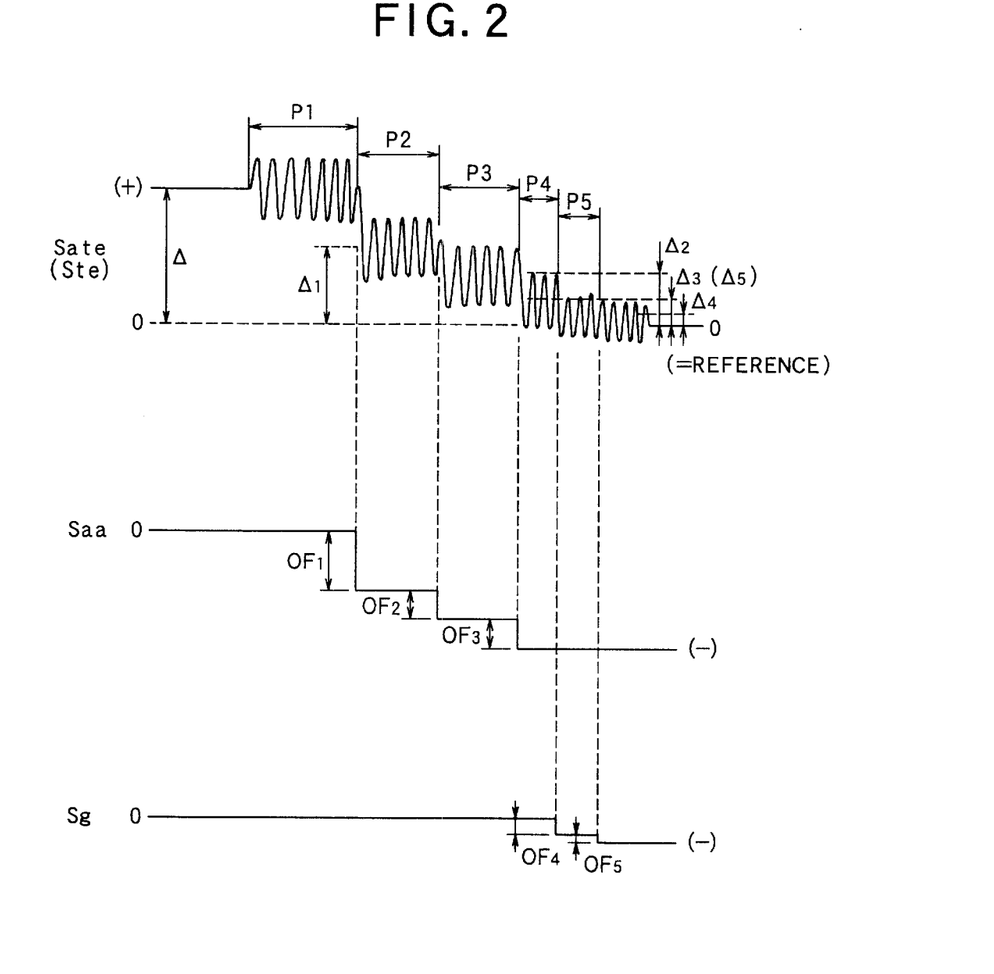
FIG. 2 is a waveform for explaining the removal of an offset.
Figure 3:
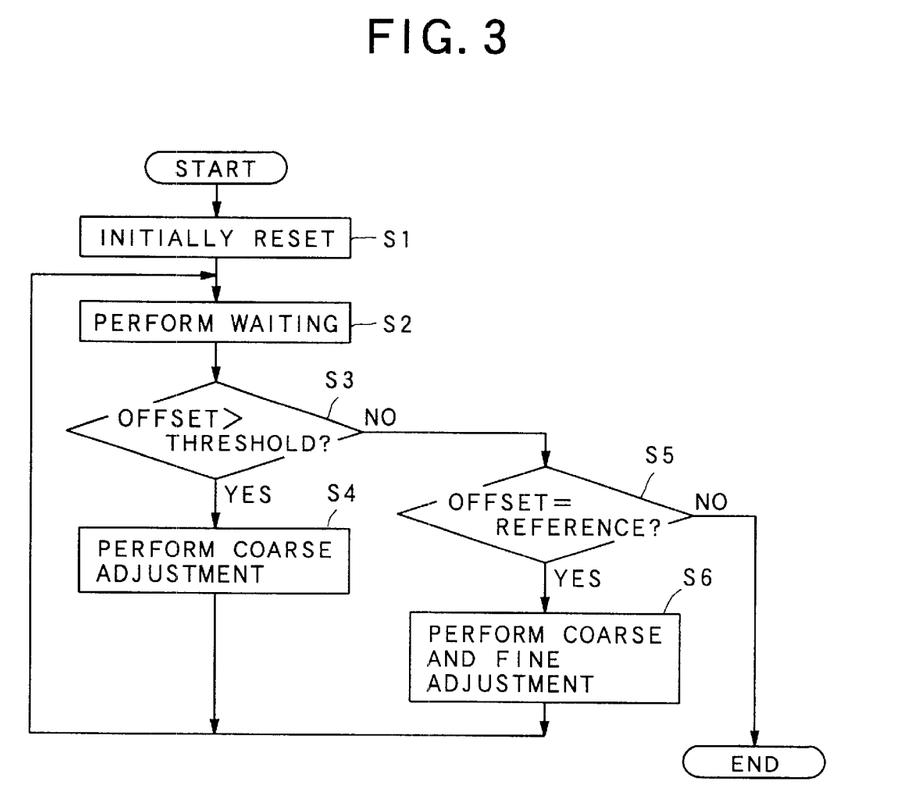
FIG. 3 is a flowchart showing the processing executed by a CPU for removing the offset.

Referring to FIGS. 1 to 3, an embodiment of the present invention will now be described.

First the configuration of an information reproducing system according to this embodiment will be described with reference to FIG. 1. In the system employed herein, only part relevant to tracking servo control according to the present invention is illustrated. Actually, in addition to the components illustrated in FIG. 1, the information reproducing system has various components or circuits, such as a focus servo mechanism responsible for focus servo control positioning both an optical beam focus and information recorded area on an optical disk during reproducing the information and a spindle servo mechanism for controlling the optical disk so as to rotate at a given speed.

As shown in FIG. 1, an information reproducing system S is provided with an optical disk 1 serving as a storage medium on which pieces of information to be reproduced are recorded, a spindle motor 2, a pickup 3, an RF (radio frequency) signal generator 4 serving as reproducing means, a reproducing unit 5 also serving as reproducing means, and a tracking-error signal generator 6 acting as generating means. Additionally, the system S is provided with an adder 7, a buffer amplifier 8, a servo control unit 10 as a tracking-error signal correcting apparatus, and a tracking actuator driver 9 employed as tracking controlling means.

The pickup 3 includes an objective lens (not shown) for converging an optical beam B onto the optical disk 1, and a tracking actuator (not shown) for making the focus of the optical beam B and an information track on the optical disk 1 agree with each other (i.e., positioning) by moving the optical disk in a radial direction of the dick 1.

The servo control unit 10 has an A/D converter 11 acting as digitizing means, an adder 12 as a second adding means, a gain controller 13, a disturbance signal generator 14 acting as generating means, and an adder 15. Additionally the unit 10 includes a CPU 16 serving as comparing means and controlling means, D/A converters 17 and 21, offset processors 18 and 20 serving as controlling means, an LPF adopted as offset detecting means, and a switch 22 operating on an electronic control basis. Each component arranged in this servo control unit 10 is composed of a digital circuit that processes signals in the digital form.

Referring to FIGS. 1 to 3, the information reproducing system S will be described in terms of its operation.

Firstly, an initial setting operation during which offset removal is executed on a technique according to the present invention will be explained.

Immediately after the optical disk 1 has been inserted into the information reproducing system S, which corresponds to a period for an initial setting operation, the optical disk 1 is still stationary, not rotated. Accordingly both the RF signal producing unit 4 and the reproducing unit 5 are not in operation.

In the initial setting operation, first executed is that the switch 22 is opened (i.e., made off) to establish an open state of a tracking servo loop in response to a control signal $S_{sc}$ provided from the CPU 16 and a preset digital-form disturbance signal $S_v$ having a sine waveform whose frequency is less than, for example, a few kilohertz is generated from the disturbance signal generator 14. The disturbance signal $S_v$ passes through the adder 15 (without any value added) to the D/A converter 21, where it is converted into an analog form, being outputted as an analog disturbance signal $S_{va}$.

The tracking actuator driver 9 regards the analog disturbance signal $S_{va}$ as a tracking-error signal, and generates a driving signal $S_{dd}$ which drives the not-shown tracking actuator placed within the pickup 3 and sends it thereto.

The pickup 3 not merely generates an optical beam B for reproducing pieces of information but also irradiates it onto a desired information track on the optical disk 1 through the not-shown objective lens. Because the driving signal $S_{dd}$ drives the not-shown tracking actuator, the objective lens is moved in oscillation at a rate corresponding to the frequency of the disturbance signal $S_v$ in a perpendicular direction to the information track (that is, the radial direction on the optical disk 1). In consequence, an irradiated area (hereinafter referred to as optical spot) by the optical beam on the optical disk 1 also oscillates at the frequency corresponding to the disturbance signal $S_v$ in the radial direction thereon.

As the next step, the optical beam B, which is irradiated in oscillation, reflects from the optical disk 1 to yield a reflected optical beam. The reflected optical beam is then detected by an optical detector not shown within the pickup 3, being outputted as a tracking-error detecting signal $S_{tp}$.

On the basis of the tracking-error detecting signal $S_{tp}$, the tracking-error signal generator 6 generates a tracking-error signal $S_{te}$ indicative of positional differences between the oscillated optical spot and an information track. The tracking-error signal $S_{te}$ is generated with, for example, a three-beam technique or push-pull technique.

The tracking-error signal $S_{te}$ oscillates at a frequency corresponding to the disturbance signal $S_v$, as illustrated in a period P1 in FIG. 2. The tracking-error signal $S_{te}$ includes an offset $\Delta$, as shown in FIG. 2, on account of the foregoing reasons.

Then, the tracking-error signal $S_{te}$ is sent via the adder 7 to the buffer amplifier 8 where the signal is amplified at a given gain. In this amplifying operation, no signal is added to the tracking-error signal $S_{te}$ by the adder 7.

The tracking-error signal thus-amplified enters the servo control unit 10, where it is first digitized by the A/D converter 11, being outputted as a digital tracking-error signal $S_d$ to the adder 12.

In the case of later-described coarse adjustment, the adder 12 is used to adjust a later-described digital adjustment-amount signal $S_g$ supplied from the offset processor 18 to the zero level at any time.

In this initial setting operation, on one hand, the digital tracking-error signal inputted to the adder 12 does not undergo any processing (i.e., without any changes experienced), and is then sent to the LPF 19 as an "added digital tracking-error signal $S_{ad}$."

The LPF 19 averages the added digital tracking-error signal $S_{ad}$ at a given time constant which was preset beforehand, so that an offset $\Delta$ included in the added digital tracking-error signal $S_{ad}$ is detected, thereby a corresponding offset signal $S_{of}$ being provided to the CPU 16. The LPF 19 is configured to be controlled operatively by a control signal $S_s$ from the CPU 16.

Based on the offset signal $S_{of}$ thus-obtained, the CPU 16 is programmed so that it computes an adjustment amount (i.e., a removal amount for an offset) for coarsely adjusting the offset, produces a corresponding adjustment-amount signal $S_{agg}$ indicating the computed amount, and outputs it to the offset processor 20. Practically the coarse adjustment is first performed such that, when the offset $\Delta$ is larger than a predetermined threshold $\Delta s$ (refer to FIG. 2, the uppermost timing chart), the offset $\Delta$ is partly removed by the coarse adjustment (i.e., correction).

The coarse adjustment referred herein is processing to coarsely remove the offset $\Delta$ from the tracking-error signal $S_{te}$ before digitized. Moreover, the adjustment amount realized by the adjustment-amount signal $S_{agg}$ is not an amount which is able to remove the entire offset at a time, but a first-stage adjustment amount for removing it step by step (refer to "OF$_1$," in the middle chart in FIG. 2).

The value of the threshold $\Delta s$ is set depending on variations in resistance values of ladder-connected resistors not-shown in the D/A converter 11 and/or variances in power voltage. Practically, for example, the threshold $\Delta s$ is set to a value as high as 5 percent or thereabout of a maximum amplitude of the tracking-error signal obtained on the design basis.

The offset processor 20 which receives the adjustment-amount signal $S_{agg}$ temporarily memorizes an adjustment amount indicated by the signal $S_{agg}$, and sends it to the D/A converter 17 as it is, as the digital adjustment-amount signal $S_a$. The D/A converter 17 converts the signal $S_a$ into an analog form to produce an analog adjustment signal $S_{aa}$, which will be sent to the adder 7.

The adder 7 adds the analog adjustment-amount signal $S_{aa}$ (whose polarity is negative) to the tracking-error signal $S_{te}$ which has been inputted, producing an "added tracking-error signal $S_{ate}$." The added tracking-error signal $S_{ate}$ has a frequency in agreement with the disturbance signal $S_v$, as shown by a period P2 in FIG. 2, whose offset is lowered to an offset $\Delta 1$ by reducing the adjustment amount OF1 from the original one $\Delta$.

The added tracking-error signal $S_{ate}$ is then amplified by the buffer amplifier 8, and digitized by the A/D converter 11, a resultant signal being sent to the adder 12 again, as a digital tracking-error signal $S_d$.

At this time when the signal $S_d$ is sent to the adder 12, the digital adjustment-amount signal $S_g$ whose level is zero has still been supplied thereto. Consequentially, the digital tracking-error signal $S_d$ experiences no changes at all at the adder 12, being sent the LPF 19 again, as an added digital tracking-error signal $S_{ad}$.

The LPF 19 performs the foregoing averaging to detect the offset $\Delta 1$ remaining in the added digital tracking-error signal $S_d$ (added tracking-error signal $S_{ate}$), providing a corresponding offset signal $S_{of}$ to the CPU 16.

The CPU 16 determines the amplitude of the inputted offset signal $S_{of}$. Since the offset $\Delta 1$ shown by the offset signal $S_{of}$ is still greater than the threshold $\Delta s$, an adjustment-amount signal $S_{agg}$ is produced for removing the offset $\Delta 1$ by the coarse readjustment and then sent to the offset processor 20. In this readjustment, the adjustment amount realized by the adjustment-amount signal $S_{agg}$ is not set to an amount which is able to remove the offset $\Delta 1$ at a time, but a second-stage adjustment amount used for removing it step by step (refer to "OF2" in the middle chart in FIG. 2).

The offset processor 20 adds an adjustment amount indicated by the signal $S_{agg}$ and the adjustment amount OF1 previously memorized and memorizes the added result temporarily, and send to the D/A converter 17 the digital adjustment-amount signal $S_a$ which corresponds to the added result. The D/A converter 17 converts the signal $S_a$ into an analog form to produce an analog adjustment signal $S_{aa}$ which will be sent to the adder 7.

The adder 7 adds the analog adjustment-amount signal $S_{aa}$ to the tracking-error signal $S_{te}$ (refer to the period P1 in FIG. 2) which has been inputted, producing an "added tracking-error signal $S_{ate}$." The added tracking-error signal $S_{ate}$ has a frequency in agreement with the disturbance signal $S_v$, as shown by a period P3 in FIG. 2, whose offset is lowered to an offset $\Delta 2$ by reducing the adjustment amount OF1+OF2 from the original one $\Delta$.

With the added tracking-error signal $S_{ate}$ including the offset $\Delta 2$, the amplification by the buffer amplifier 8 and the digitization by the A/D converter 11 are executed as above.

A resultant digital tracking-error signal $S_d$ is sent again to the LPF 19 via the adder 12 (where no signal is added). At the LPF 19, the offset $\Delta 2$ is detected, and the coarse adjustment is again executed through the CPU 16, offset processor 20, D/A converter 17 and adder 7 so as to remove the detected offset $\Delta 2$ (greater than the threshold $\Delta s$). At this time, the adjustment amount indicated by the adjustment-amount signal $S_{agg}$ is set to a third-stage adjustment amount (refer to OF3 in FIG. 2) which is capable of removing the offset $\Delta 2$ as much as possible. That is, the offset removal is performed at the stage of the analog signal at its best, resulting in the removal of all the offset components lager than the threshold $\Delta s$. In the offset processor 20, an adjustment amount to which the amounts OF1, OF2 and OF3 added is memorized, which corresponds to an adjustment amount included in the digital adjustment-amount signal $S_a$.

The added tacking-error signal $S_{ate}$ which has been made by reducing the analog adjustment-amount signal $S_{aa}$ corresponding to the added adjustment amount, includes an offset $\Delta 3$, as shown by a period P4 in the uppermost timing chart in FIG. 2. The offset $\Delta 3$, which has been produced by removing a maximum offset possible to be removed through this coarse adjustment, is made to approximate the threshold offset $\Delta s$.

The added tracking-error signal $S_{ate}$ including the offset $\Delta 3$ is then amplified by the buffer amplifier 8, digitized by the A/D converter 11, and being routed to the LPF 19 via the adder 12, as a digital tracking-error signal $S_d$.

The LPF 19 detects the offset $\Delta 3$ still existing in the digital tracking-error signal $S_d$ (added tracking-error signal $S_{ate}$) through the above-described averaging, and outputs a corresponding offset signal $S_{of}$ to the CPU 16.

The offset signal $S_{of}$ undergoes discrimination by the CPU 16. Because the offset $\Delta 3$ represented by the offset signal $S_{of}$ is less than the threshold $\Delta s$, the CPU 16 makes an adjustment-amount signal $S_{ag}$ for removing the offset $\Delta 3$ with a fine adjustment, and provides it for the offset processor 18.

The fine adjustment executed herein is processing to remove the offset $\Delta 3$ at the stage of the digital tracking-error signal $S_d$ already digitized. An adjustment amount brought by the adjustment-amount signal $S_{ag}$ is set to an amount to remove the offset $\Delta 3$ as precisely as possible (refer to OF4 ($\approx \Delta 3(\Delta s)$) in the lowermost timing chart in FIG. 2).

The offset processor 18 temporarily memorizes the adjustment amount OF4 represented by the adjustment-amount signal $S_{ag}$, and provides it, as it is, for the adder 12, as a digital adjustment-amount signal $S_g$ (refer to the lowermost chart in FIG. 2).

On one hand, when it is found that the offset $\Delta 3$ brought by the offset signal $S_{of}$ is smaller than the threshold $\Delta s$, the CPU 16 provides the offset processor 20 a control signal $S_{sa}$ instructing it to keep outputting to the D/A converter 17 the digital adjustment-amount signal $S_a$ indicative of the adjustment amount "OF1+OF2+OF3" stored therein at that time. In response to this, the D/A converter 17 provides the adder 7 a corresponding analog adjustment-amount signal $S_{aa}$.

Once an offset which still remains in the tracking-error signal becomes smaller than the threshold $\Delta s$ by the above processing, the offset is kept to an amount smaller than the offset $\Delta 3$ in the succeeding processing of the digital tracking-error signal $S_d$.

The adder 12 adds the digital adjustment-amount signal $S_g$ to the digital tracking-error signal $S_d$ inputted, generating an added digital tracking-error signal $S_{ad}$ (refer to a period P5 in FIG. 2).

The LPF 19 then detects an offset $\Delta 4$ from the added digital tracking-error signal $S_{ad}$, and outputs a corresponding offset signal $S_{of}$ to the detected offset $\Delta 4$. The offset $\Delta 4$, which is less than the offset $\Delta 3$, is an offset made by the reduction with the digital adjustment-amount signal $S_g$ including the adjustment amount OF4. This detected offset $\Delta 4$ has already been below the threshold $\Delta s$.

When it is determined that the detected offset $\Delta 4$ is smaller than the threshold $\Delta s$, the CPU 16 not merely provides the control signal $S_{sa}$ for the offset processor 20 in order to maintain performing the coarse adjustment with the adjustment amount of OF1+OF2+OF3 through a route from the offset processor 20, D/A converter 17 to adder 7 but also compares the offset $\Delta 4$ to a preset reference. The reference, which corresponds to the center level of the dynamic range of the D/A converter 11, is under the threshold $\Delta s$ and substantially equal to a signal level when the offset $\Delta$ is zero. In this embodiment, a situation where the offset $\Delta 4$ is over the reference is exemplified. Thus, the CPU 16 produces again a new adjustment-amount signal $S_{ag}$ to output it to the offset processor 18 such that an offset included in the added digital tracking-error signal $S_{ad}$ is made to agree with the reference.

An adjustment amount brought by the new adjustment-amount signal $S_{ag}$ is confined to make the offset $\Delta 4$ agree with the reference at the lowest possible error (refer to OF5 in the lowermost timing chart in FIG. 2).

The offset processor 18 adds an adjustment amount OF5 brought by the received adjustment-amount signal $S_{ag}$ and the previously-stored adjustment-amount OF4 to each other, then temporarily memorizes its added result, in addition to providing the adder 12 a digital adjustment-amount signal $S_g$ corresponding to the added adjustment amount "OF4+OF5."

The adder 12, in response to this providing, adds the digital adjustment-amount signal $S_g$ to the digital tracking-error signal $S_d$ (having a waveform shown in a period P4 in FIG. 2 and having an offset $\Delta 3$) which has been received to generate again an added digital tracking-error signal $S_{ad}$. The offset included in the added digital tracking-error signal $S_{ad}$ is reduced from the offset $\Delta 3$ by the amount "OF4+OF5."

Hereafter, the above coarse and fine adjustment is repeatedly performed until the offset included in the added digital tracking-error signal $S_{ad}$ becomes equal to the reference. When both the amounts become equal to each other, the offset removal operation in the initial setting comes to an end. At the end of the initial setting, an amount OF for the coarse adjustment expressed by $$OF = OF1 + OF2 + OF3 \qquad (1)$$

is stored in the offset processor 20, whereas an adjustment (=OF4+OF5) amount for the fine adjustment is stored in the offset processor 18.

Referring to FIG. 3, the operation of the CPU 16 executed associated with the foregoing initial setting will now be described. First, as an initial reset operation, the outputs of the A/D converter 11, the D/A converter 17 and the LPF 19 are reset and the application of the disturbance signal $S_v$ is initiated (step S1).

Then, waiting is performed to permit the LPF 19 to detect an offset included in the digital tracking-error signal $S_d$ against the applied disturbance signal $S_v$ (step S2). An interval of the waiting is approximately 50 milliseconds, for example.

A detected offset is then compared to the threshold $\Delta s$ (step S3). In the case that the offset is greater than the threshold Δs (YES at step S3), the foregoing coarse adjustment is commanded (step S4), and the processing is returned to step S2 to repeatedly perform the coarse adjustment until realizing the offset smaller than the threshold Δs.

To the contrary, by the determination at step S3, where an offset included in the digital tracking-error signal $S_d$ becomes smaller than the threshold Δs (NO at step S3), it is then determined whether or not the offset substantially equals to the reference (step S5).

In cases where the offset substantially equals to the reference (YES at step S5), the offset removal operation terminates, while in opposite cases (NO at step S5), the digital tracking-error signal $S_d$ undergoes the foregoing coarse and fine adjustment operations again (step S6). The processing is then passed to step S2 to repeat the foregoing operations until the offset becomes equal to the reference.

Using FIG. 1, the operation for information reproduction which is performed after the initial setting operation will be described. For the information reproduction, the disturbance signal generator 14 and the LPF 19 are brought into the non-operation state.

In response to a command for reproducing information, the switch 22 is brought into the "on" state through control of the CPU 16, resulting in the closed tracking servo loop.

By the not-shown spindle servo control mechanism, the spindle motor 2 is controlled in the rotation, so that the optical disk 1 rotates at a given speed during reproduction of information.

The pickup 2 irradiates, with tracking servo control, an optical beam B toward the optical disk 1 which is rotating, and concurrently, receives an optical beam of the irradiated optical beam B reflected from the optical disk 1. From the reflected optical beam, the pickup 2 not merely produces a detection signal $S_p$ which corresponds to information recorded on the optical disk 1 but also produces a tracking-error signal $S_{tp}$ which represents positional differences between the irradiated optical beam B and an information track.

By the tracking-error signal generator 6, a tracking-error signal $S_{te}$ is generated using the produced tracing-error detection signal $S_{tp}$. Because of the foregoing reasons, the tracking-error signal $S_{te}$ includes an offset Δ, as shown in FIG. 2.

On one hand, a digital adjustment-amount signal $S_a$ corresponding to an adjustment amount OF stored in the offset processor 20 is supplied to the D/A converter 17 from the offset processor 20. The adjustment amount OF is given by the foregoing expression (1). The signal $S_a$ is converted into an analog form by the D/A converter 17, being supplied to the adder 7, as an analog adjustment-amount signal $S_{aa}$.

By the adder 7, the analog adjustment-amount signal $S_{aa}$ is added to the tracking-error signal $S_{te}$ lowering the offset Δ existing in the tracking-error signal $S_{te}$ down to an offset Δ3, before producing an added tracking-error signal $S_{ate}$.

The added tracking-error signal $S_{ate}$ is then amplified by the buffer amplifier 8, and digitized by the A/D converter 11, resulting in that a digital tracking-error signal $S_d$ is sent to the adder 12.

Concurrently with this, sent from the offset processor 18 to the adder 12 is a digital adjustment-amount signal $S_g$ which corresponds to an adjustment amount stored therein, which is an amount made by adding the adjustment amount OF5 to OF4, as described before.

By the adder 12, the digital adjustment-amount signal $S_g$ is added to the digital tracking-error signal $S_d$, thereby the offset Δ3 remaining within the digital tracking-error signal $S_d$ being removed. In consequence, the offset included in the digital tracking-error signal $S_d$ are made to agree with the reference set as the lowest possible value, and an added digital tracking-error signal $S_{ad}$ is produced.

The added digital tracking-error signal $S_{ad}$ is then gain-adjusted to a predetermined one by the gain controller 13, and is passed through the adder 15 to the D/A converter 21.

Furthermore, the signal $S_{ad}$ thus-obtained is converted into the analog form by the D/A converter 21, producing an analog tracking-error signal $S_{ada}$ which will be supplied to the tracking actuator driver 9.

In the driver 9, a driving signal $S_{dd}$ in agreement with the analog tracking-error signal $S_{ada}$ is generated to be sent to the not-shown tracking actuator installed in the pickup 3. In response to the driving signal, tracking servo control is performed.

On the basis of the detection signal $S_p$, which has been detected with the foregoing tracking servo control performed, a reproducing RF signal $S_{rf}$ which corresponds to information to be reproduced recorded on the optical disk 1 is generated by the RF signal generator 4.

In the reproducing unit 5, the reproducing RF signal $S_{rf}$ thus-generated is processed with a decoding operation and others, and converted into a reproducing signal $S_{pp}$ representing the information to be reproduced, being outputted to an external component.

According to this information reproducing system S, a two-stage adjustment operation composed of coarse and fine adjustment is carried out successively. To the analog tracking-error signal $S_{te}$ (before digitization) including an offset larger than a predetermined threshold, the coarse adjustment is first applied, the offset being removed coarsely from the signal. Then, to the digitized tracking-error signal $S_{te}$ of which offset has already been lowered to an amount not more than the threshold, the fine adjustment will be applied, the residual offset being finely removed. As a result, the offset can be removed more steadily and accurately from the tracking-error signal $S_{te}$ processed in the digital form in the final stage, leading to more accurate and more stable reproduction of pieces of information.

In the above embodiment, description in the initial setting has been given on condition a signal level when the offset Δ is zero approximately equals the reference.

To the contrary, this condition is not true due to variations in the power source voltage in the A/D converter 11, and others, the foregoing fine adjustment should be performed for a plurality of times so that the offset included in the digital tracking-error signal $S_d$ is made to be equal to the reference.

An alternative embodiment according to the present invention will be described.

In the initial setting in the foregoing embodiment, the disturbance signal $S_v$ is generated by the disturbance signal generator 14, and the resultant optical spot is moved to oscillate against an information track to produce the tracking-error signal $S_{te}$. An alternative to producing the tracking-error signal $S_{te}$ in the initial setting is a method of making use of eccentricity inherent to the optical disk, without using such disturbance signal $S_v$. That is, the optical disk 1 is rotated such that a track of information is oscillated, thanks to the eccentricity against the optical in the radial direction of the disk. This also enables the production of such a tracking-error signal from which an offset is surely removed, like the foregoing embodiment.

Moreover, in the initial setting, the utilization of the eccentricity of the optical dick 1 can be combined with the application of the disturbance signal $S_v$ to produce such a tracking-error signal.

Any alternative embodiment described above provides the same or similar advantage as or to the forgoing embodiment shown in FIGS. 1 to 3.

Numerous other modifications and variations of the present invention will be apparent to those skilled in the art in view of the foregoing description. Thus, it is to be understood that, within the scope of the appended claims, the present invention may be practiced other than as specifically described hereinabove.

The entire disclosure of Japanese Patent Application No.09-325690 filed on Nov. 27, 1997 including the specification, claims, drawings and summary is incorporated herein by reference in its entirety.

What is claimed is:

1. An apparatus for correcting an offset included in a tracking-error signal indicative of a difference between a position of an information track formed on a storage medium with information to be reproduced and a position of an optical beam irradiated onto the storage medium to reproduce the information, the apparatus comprising:

producing means for producing the tracking-error signal in an analog form based on a reflected beam of the optical beam from the storage medium;

first adding means for adding a first offset-correcting signal to the analog tracking-error signal for removal of the offset therefrom, thereby producing an added tracking-error signal in the analog form;

digitizing means for digitizing the added tracking-error signal to produce a digital tracking-error signal;

second adding means for adding a second offset-correcting signal to the digital tracking-error signal for removal of the offset therefrom, thereby producing an added digital tracking-error signal;

detecting means for detecting the offset corresponding to a difference between a center level of the tracking-error signal and a preset reference level;

comparing means for comparing the detected offset with a threshold preset based on a maximum amplitude of the tracking-error signal; and controlling means for providing the first offset-correcting signal for the first adding means when the comparing means show that the detected offset is not less than the threshold, and for providing the second offset-correcting signal for the second adding means when the comparing means show that the detected offset is smaller than the threshold.

2. The apparatus of claim 1, wherein the producing means has a first element for irradiating the optical beam toward the storage medium and a second element for causing an irradiated position of the optical beam to be relatively oscillated in a perpendicular direction to a direction of the information track.

3. The apparatus of claim 2, wherein the second element has a generator generating an oscillating disturbance signal and a member driving the first element based on the disturbance signal.

4. The apparatus of claim 3, wherein the offset detecting means is configured to detect the offset from any one of the analog tracking-error signal, the digital tracking-error signal, and the added digital tracking-error signal.

5. The apparatus of claim 4, wherein the offset detecting means is configured to detect the offset from the added digital tracking-error signal.

6. The apparatus of claim 1, wherein the controlling means has first means for individually setting the first and second offset-correcting signals.

7. The apparatus of claim 6, wherein the setting means is configured to operate in an initial period in a reproduction operation of the information.

8. The apparatus of claim 7, wherein the setting means has means for allowing calculation of an adjustment amount to be repeated a plurality of times through operation of the producing means, the first adding means, the digitizing means, the second adding means, the offset detecting means, and the comparing means, the calculated adjustment amount being summed up and composing each offset-correcting signal.

9. An apparatus for correcting a tracking-error signal used for positionally controlling an optical beam irradiated onto a storage medium to reproduce information recorded thereon, the tracking-error signal being detected in an analog form, the apparatus comprising:

digitizing means for digitizing the tracking-error signal in the analog form;

setting means for setting an adjustment amount to correct an offset which is included in the digitized tracking-error signal and corresponds to a difference between a center level of the digitized tracking-error signal and a preset reference level;

correcting means for correcting the offset included in the digitized tracking-error signal with the set adjustment amount;

further setting means for setting a further adjustment amount to correct a further offset which is included in the analog-form tracking-error signal and corresponds to a difference between a center level of the analog-form tracking-error signal and the preset reference level; and further correcting means for correcting the further offset included in the analog-form tracking-error signal with the set further adjustment amount.

10. A method of correcting a tracking-error signal used for positionally controlling an optical beam irradiated onto a storage medium to reproduce information recorded thereon, the tracking-error signal being produced in an analog form, then converted into a digital form for use of control of the optical beam, comprising the steps of:

setting a first adjustment amount to correct an offset which is included in the analog-form tracking-error signal and corresponds to a difference between a center level of the analog-form tracking-error signal and a preset reference level as well as a second adjustment amount to correct a further offset which is included in the digital-form tracking-error signal in the digital form and corresponds to a difference between a center level of the digital-form tracking-error signal and the present reference level;

first correcting the analog-form tracking-error signal with the first adjustment amount; and second correcting the digital-form tracking-error signal with the second adjustment amount.

11. A system for reproducing information recorded on a storage medium, in which a tracking-error signal indicative of a difference between a position of an information track formed on the recording and an irradiated position of an optical beam irradiated onto the storage medium is used for tracking servo control, the system comprising:

an apparatus for correcting an offset included in the tracking-error signal, wherein the apparatus comprises:

producing means for producing the tracking-error signal in an analog form based on a reflected beam of the optical beam from the storage medium;

first adding means for adding a first offset-correcting signal to the analog tracking-error signal for removal of the offset therefrom, thereby producing an added tracking-error signal in the analog form;

digitizing means for digitizing the added tracking-error signal to produce a digital tracking-error signal;

second adding means for adding a second offset-correcting signal to the digital tracking-error signal for removal of the offset therefrom, thereby producing an added digital tracking-error signal;

detecting means for detecting the offset corresponding to a difference between a center level of the tracking-error signal and a preset reference level;

comparing means for comparing the detected offset to a threshold preset on a maximum amplitude of the tracking-error signal; and controlling means for providing the first offset-correcting signal for the first adding means when the comparing means show that the detected offset is not less than the threshold, and for providing the second offset-correcting signal for the second adding means when the comparing means show that the detected offset is smaller than the threshold;

means for tracking-controlling the irradiated position of the optical beam on the basis of the added digital tracking-error signal; and means for reproducing the recorded information on the basis of the reflected beam.

12. An apparatus for correcting an offset included in a tracking-error signal indicative of a difference between a position of an information track formed on a storage medium with information to be reproduced and a position of an optical beam irradiated onto the storage medium to reproduce the information, the apparatus comprising:

a tracking-error signal generator for generating the tracking-error signal in an analog form based on a reflected beam of the optical beam from the storage medium;

a first adder for adding a first offset-correcting signal to the analog tracking-error signal for removal of the offset therefrom, thereby producing an added tracking-error signal in the analog form;

a digitizer for digitizing the added tracking-error signal to produce a digital tracking-error signal;

a second adder for adding a second offset-correcting signal to the digital tracking-error signal for removal of the offset therefrom, thereby producing an added digital tracking-error signal;

a detector for detecting the offset corresponding to a difference between a center level of the tracking-error signal and a preset reference level;

a comparator for comparing the detected offset with a threshold preset based on a maximum amplitude of the tracking-error signal; and a controller for providing the first offset-correcting signal for the first adder when the comparator shows that the detected offset is not less than the threshold, and for providing the second offset-correcting signal for the second adder when the comparator shows that the detected offset is smaller than the threshold.

13. The apparatus of claim 12, wherein the tracking-error signal generator has a first element for irradiating the optical beam toward the storage medium and a second element for causing an irradiated position of the optical beam to be relatively oscillated in a perpendicular direction to a direction of the information track.

14. The apparatus of claim 13, wherein the second element has a generator generating an oscillating disturbance signal and a member driving the first element based on the disturbance signal.

15. A system for reproducing information recorded on a storage medium, in which a tracking-error signal indicative of a difference between position of an information track formed on the recording and an irradiated position of an optical beam irradiated onto the storage medium is used for tracking servo control, the system comprising:

an apparatus for correcting an offset included in the tracking-error signal, wherein the apparatus comprises:

a tracking-error signal generator for generating the tracking-error signal in an analog form based on a reflected beam of the optical beam from the storage medium;

a first adder for adding a first offset-correcting signal to the analog tracking-error signal for removal of the offset therefrom, thereby producing an added tracking-error signal in the analog form;

a digitizer for digitizing the added tracking-error signal to produce a digital tracking-error signal;

a second adder for adding a second offset-correcting signal to the digital tracking-error signal for removal of the offset therefrom, thereby producing an added digital tracking-error signal;

a detector for detecting the offset corresponding to a difference between a center level of the tracking-error signal and a preset reference level;

a comparator for comparing the detected offset to a threshold preset on a maximum amplitude of the tracking-error signal; and a controller for providing the first offset-correcting signal for the first adder when the comparator shows that the detected offset is not less than the threshold, and for providing the second offset-correcting signal for the second adder when the comparator shows that the detected offset is smaller than the threshold;

a tracking controller for controlling the irradiated position of the optical beam on the basis of the added digital tracking-error signal; and a reproducing unit for reproducing the recorded information on the basis of the reflected beam.

16. A method for correcting an offset included in a tracking-error signal indicative of a difference between a position of an information track formed on a storage medium with information to be reproduced and a position of an optical beam irradiated onto the storage medium to reproduce the information, the method comprising the steps of:

producing the tracking-error signal in an analog form based on a reflected beam of the optical beam from the storage medium;

adding a first offset-correcting signal to the analog tracking-error signal for removal of the offset therefrom, thereby producing an added tracking-error signal in the analog form;

digitizing the added tracking-error signal to produce a digital tracking error signal;

adding a second offset-correcting signal to the digital tracking-error signal for removal of the offset therefrom, thereby producing an added digital tracking-error signal;

detecting the offset corresponding to a difference between a center level of the tracking-error signal and a preset reference level;

comparing the detected offset with a threshold preset based on a maximum amplitude of the tracking-error signal; and providing the first offset-correcting signal when the comparing step shows that the detected offset is not less than the threshold, and providing the second offset-correcting signal when the comparing step shows that the detected offset is smaller than the threshold.

* * * * *